United States Patent

Caron et al.

[11] Patent Number: 5,967,242
[45] Date of Patent: Oct. 19, 1999

[54] PROTECTING COMPACTOR AXLES, SEALS AND WHEEL BEARINGS FROM WIRE WRAP INTRUSION

[75] Inventors: James O. Caron, Modesto; Scott F. P. Caron, Salida; Donald Chris Bettencourt, Modesto, all of Calif.

[73] Assignee: Caron Compactor Co., Modesto, Calif.

[21] Appl. No.: 09/080,059

[22] Filed: May 15, 1998

[51] Int. Cl.⁶ .................................................. E01C 19/26
[52] U.S. Cl. .................... 172/817; 172/508; 172/540; 404/121; 404/124; 404/128; 301/106; 301/109; 301/110
[58] Field of Search ..................................... 172/817, 534, 172/535, 536, 537, 540, 508, 509, 510, 514, 517; 404/121, 122, 124, 128; 301/105.1, 106, 109, 110

[56] References Cited

U.S. PATENT DOCUMENTS

| | | | |
|---|---|---|---|
| 3,922,106 | 11/1975 | Caron et al. | 404/121 |
| 4,950,102 | 8/1990 | Zeitz | 404/121 |
| 4,991,662 | 2/1991 | Caron et al. | 172/701.1 |
| 5,676,493 | 10/1997 | Brockway | 404/121 X |

OTHER PUBLICATIONS

Photos of prior art Caterpillar manufactured wheels, date unknown.

*Primary Examiner*—Christopher J. Novosad
*Attorney, Agent, or Firm*—Donald N. MacIntosh; Flehr, Hohbach, Test, Albritton & Herbert

[57] ABSTRACT

On a compactor wheel having outer and inner cylindrical drums, the inner drum being mounted on the vehicle axle, there is provided an axially extending shroud. The shroud is equipped with a cover plate which together serves to define a cavity enclosing the axle seals and bearings preventing trash from intruding into those components of the compactor vehicle.

8 Claims, 6 Drawing Sheets

PROTECTING COMPACTOR AXLES, SEALS AND WHEEL BEARINGS FROM WIRE WRAP INTRUSION

BACKGROUND OF THE INVENTION

This invention concerns generally compaction machinery which operates in sanitary landfills and particularly refers to improvements in protecting the axle shafts, bearing seals and wheel bearings of compaction equipment from the destructive effects of wire wrap and the like.

The compaction equipment used on sanitary landfill operations represent a substantial capital investment and must operate over thousands of hours, ideally with very little downtime beyond that which is necessary for refueling. The equipment is generally of the four wheel tractor type with a dozer blade on the front. Compaction wheels with cleats are mounted so that the tractor may grind and crush the solid waste material thereby reduce the material in volume for compaction into the landfill. The compaction wheels have high destructive characteristics but, nevertheless, encounter problems with wire, bedsprings, tarpaulins and plastic trash bags normally found at a solid waste landfill. The and other materials frequently become entwined about the axle shafts which drive the compaction wheels. Over time the entwined material penetrates into the wheel bearing and seals and may disable one or more of the compaction wheels causing substantial downtime.

In the trade the term "wire-wrap" is used to designate the trash materials including wire, plastic elements which become twisted up and which are found entrained upon the wheel axles. Dislodging the wire wrap on the vehicle is a compelling operation. First, the vehicle must be shut down for a period on the order of a day and half. Each of the four compaction wheels impeded by the wire wrap must be inspected and usually must be dismounted. This operation occupies 2 or 3 workmen using heavy duty lifting equipment to handle the steel compaction wheels. Workmen then apply various tools available to tear-down and remove the wire wrap from the vehicle. Over time wire wrap takes on some of the characteristics of concrete and is stubborn to dislodge. It can seriously damage the inner wheel spider cone. After the wire wrap has been removed, the bearings and bearing seals must be examined and replaced if there has been damage to these components. Then the compaction wheels are fitted onto the landfill compactor. The entire operation is costly. In the field of sanitary landfill operations there has been a long sought need for apparatus which would reliably exclude wire wrap from the wheel axle and its seals and bearings for tractors working at the landfill.

SUMMARY OF THE INVENTION AND OBJECTS

A specially adapted compaction roller is mounted upon the axle shaft of a tractor vehicle used in a sanitary landfill. The roller is equipped with a plurality of spaced apart circumferential rows of compaction cleats mounted upon a rigid cylindrical outer drum. A rigid cylindrical inner drum is coaxially disposed with respect to the outer drum and frusto-conically shaped, radially extending web members are fixedly secured to the outer and to the inner drums such that the inner drum is positioned inwardly of the perimeter edges of the outer drum at least on a proximal side of the roller. Flange means are provided on the inner drum for mounting the roller with respect to the axle shaft of the tractor vehicle. Cylindrical shroud means are fixedly secured to and rotatable with the roller and extend axially outwardly from the roller beyond the perimeter edges of the roller on the proximal side thereof. The shroud means surround and enclose the vehicle axle shaft housing and associated bearings and seals such that the shroud defines within the roller an axially extending cavity into which the axle shaft and housing projects and into which wire wrap is unable to penetrate.

A general object of the invention is to protect from the destructive characteristics of wire wrap the wheel bearings and seals of compaction equipment operating at sanitary landfills.

Another object of the invention is to provide reliable apparatus for excluding from entwining upon the axle shaft wire wrap comprising wound up tarpaulins, plastic bags, bed springs and like trash commonly found in sanitary landfills.

Still another object is to provide apparatus for enclosing the rotating axle shafts, wheel bearings, etc. within a cavity established by a rotatable shroud and a fixed closure plate arranged to provide a serpentine path from the exterior towards the wheel bearings thus excluding wire wrap from the rotating members on the inside of the cavity.

Still another object of the invention is to provide a highly reliable trash guard for compactor vehicles that is simple in design, rugged in construction and which is effective over a long service life of the vehicle operating in a sanitary landfill.

These and other objects of the invention will become more readily evident from the following detailed description of the preferred embodiment when considered in conjunction with the drawings.

DESCRIPTION OF THE PREFERRED EMBODIMENT

Figure 1:
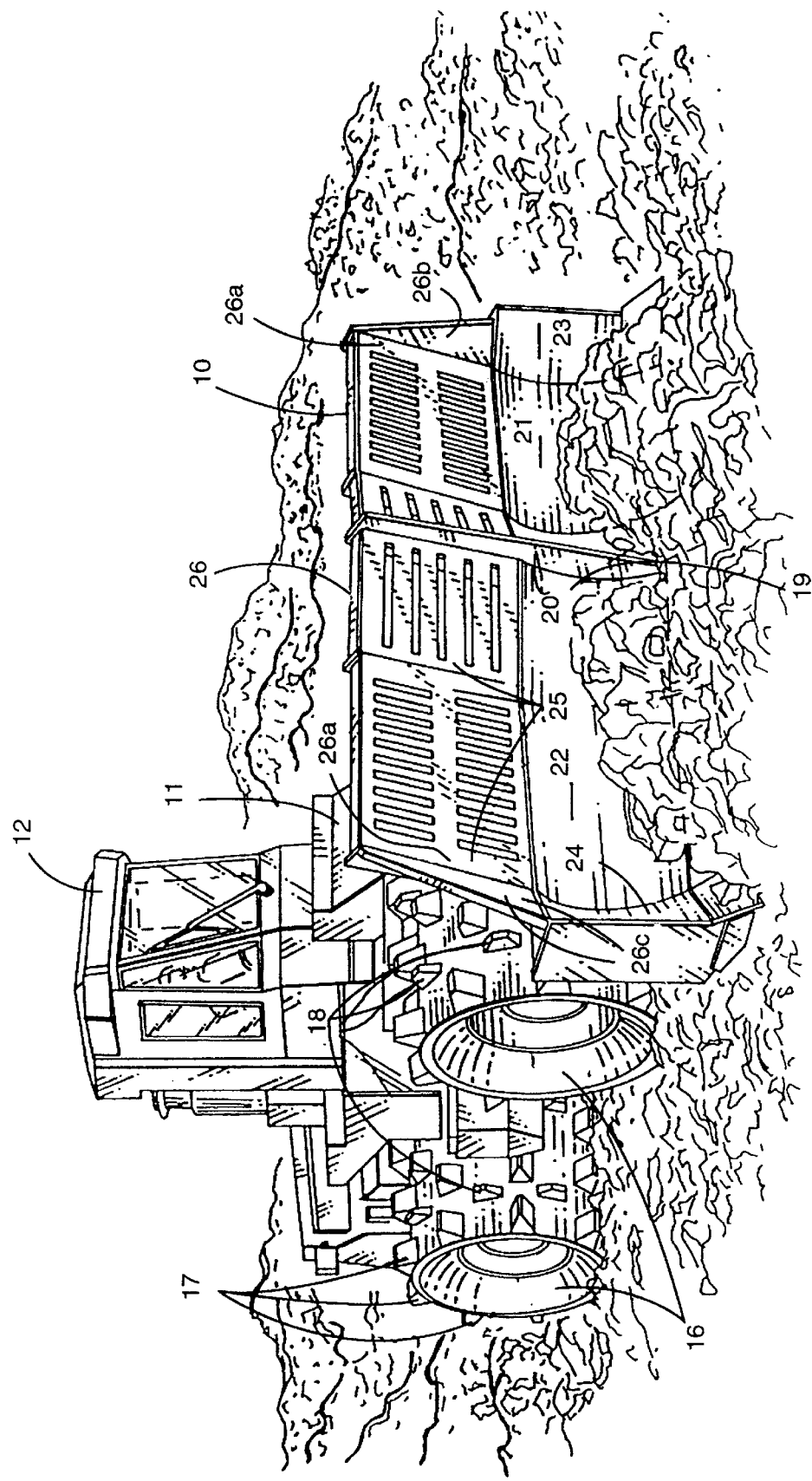
FIG. 1 shows a perspective view of compaction equipment including a wheel tractor equipped with a dozer blade, the tractor being provided with four compaction rollers each equipped with tractive and destructive cleats.

Referring to FIG. 1 of the drawings, there is shown improved compaction rollers 10 equipped for protecting the axle seals and wheel bearings of the trash compactor 11 which is shown in its working environment, a sanitary landfill site 12. As well understood, a sanitary landfill is the final depository of unwanted products and residues of households and factories. All varieties of products used in our everyday lives, ultimately come to reside in the landfill and the most troublesome of these includes the plastic garbage bags and wire bed springs, plastic tarpaulins, etc. This debris is worked upon by the trash compactor 11 and is frequently twisted into a wire like product which snares and entrains on the vehicle if proper safeguards are not taken. This is called "wire wrap."

Figure 2:
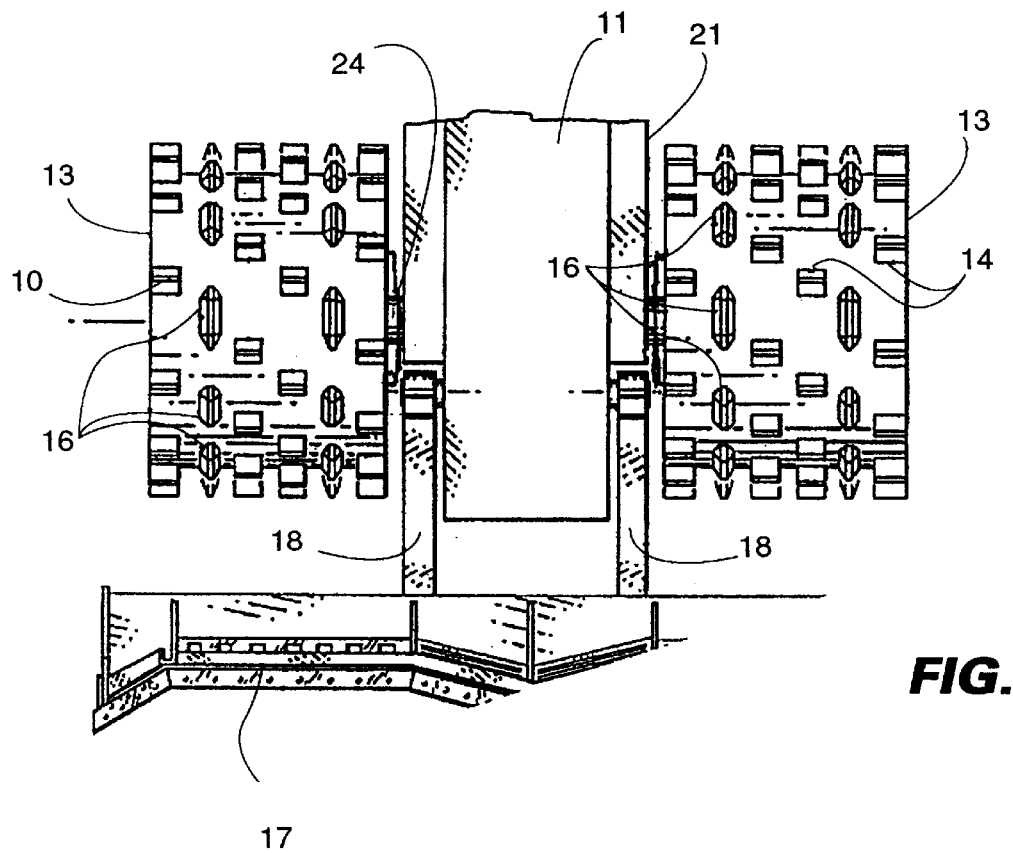
FIG. 2 is a plan view, partially broken way, showing the rollers and axle together with the dozer blade of the vehicle illustrated in FIG. 1.

The trash compactor 11 is equipped with four compaction rollers 10 on the outer drum 13 on which are mounted ground engaging feet or cleats 14 and 16. As disclosed in U.S. Pat. No. 3,922,106 granted Nov. 25, 1975 to Caron Compactor Company, the cleats 14 are of the high tractive type with laterally disposed wedge faces organized in rows along the side of the roller 10. The cleats or feet 16 are of high destructive characteristics with bodies and cutting edges elongated in the rolling direction and organized in rows intermediate the tractive feet 14. Ideally, both type of feet 14, 16 have replaceable wear caps. A landfill spreader blade assembly 17 of a type serving to deflect trash to opposite sides of the center line of the compactor 11 is mounted to the unit by the trunnion members 18 as shown in FIG. 2. Preferably, the blade assembly 17 is constructed in accordance with U.S. Pat. No. 4,991,662 granted Feb. 12, 1991 to Caron Compactor Company. The trash blade 17 serves to organize the trash for work beneath the compaction rollers 10 and it will be appreciated that in the action of the cleats 14 and 16 substantial work is placed into the trash to drive it into the ground and to reduce its size and volume so that the maximum quantities of material may be contained within the area available at the sanitary landfill. During this work between the blades 17 and rollers 10 it has been found that wire-wrap is generated and becomes attracted to the wheel axles and in time virtually disables the axles by penetrating into the areas of the wheel bearings and seals.

Referring now more particularly to FIGS. 1, 3, 4 and 7, it will be seen that the compaction roller 10 includes the outer drum 13, an inner drum 21 and outside and inside, frusto-conically shaped radially extended web members 22. This web members are fixedly secured as by welding to the outer drum 13 and to the inner drum 21. The inner drum 21 is equipped with an angular flange 23 having provisions for mounting to the axle 24 of the trash compactor 11. It will be appreciated from FIGS. 3, 4 and 7 that the web members 22 are dished inwardly from their connection weld seam with the outer drum 13.

The axle housing 24 provides a mounting for the wheel bearings and seal to assembly (not shown). The final drive 26 transmits driving forces from the vehicle transmission (not shown) for rotation of the compaction rollers 10.

A cylindrical shroud 31 is welded to the inner drum 21 and extends axially outwardly from the roller 10 beyond the edge of the outer drum 13 a distance on the order of 4 to 9 inches. A ring-like flange or lip 32 extends radially outwardly from the shroud 31. An interior wire trap ring 33 is positioned on the inside of the shroud inwardly of its outer edge as clearly shown in FIGS. 3, 4 and 7. It will be understood that FIGS. 3–5 show the proximal side of the roller 10, the side that is next adjacent to the body of the tractor or compactor 11.

A plurality of circumferentially spaced apart axially extending flanges 34 are arranged along the outer circumference of the shroud 31 and are welded to the circumferential outer flange 32 serving to provide a rigid structure for resisting the forces encountered from compaction action at the sanitary landfill site. The flanges 34 also serve to provide a discontinuity in the otherwise smooth circumferential outer surface of the shroud 31 and should material be entrained over the shroud, the axial flanges 34 will provide a space into which tools may be inserted into for dislodging any materials that become fixed to the roller 10. However, it is rare that wire wrap materials gain a grip on or adhere to the substantially smooth, large diameter cylindrical surface.

Figure 3:
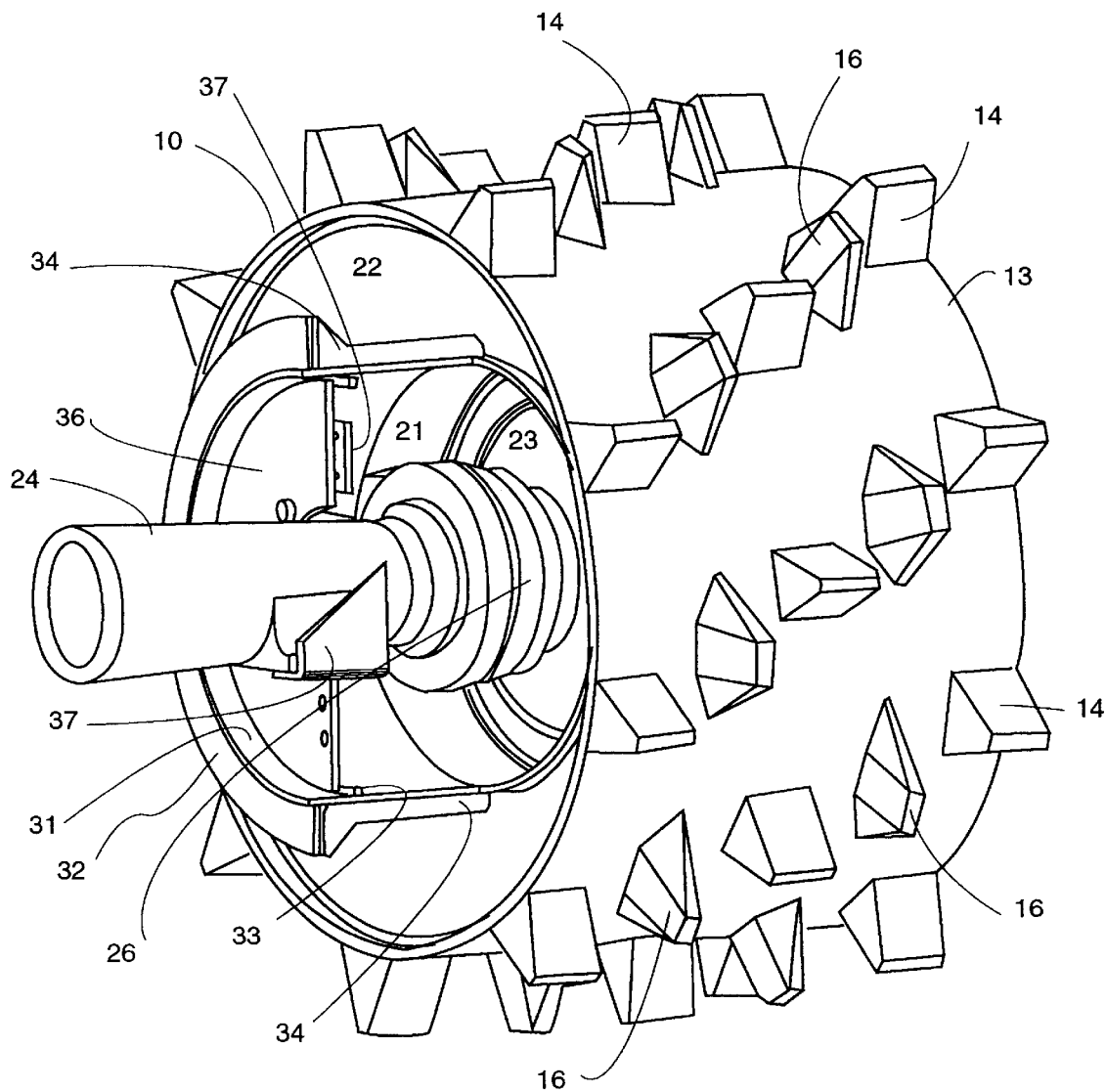
FIG. 3 is an enlarged perspective view of one of the rollers of the vehicle shown in FIG. 1, the parts being broken away to clearly illustrate features of the present invention.
Figure 4:
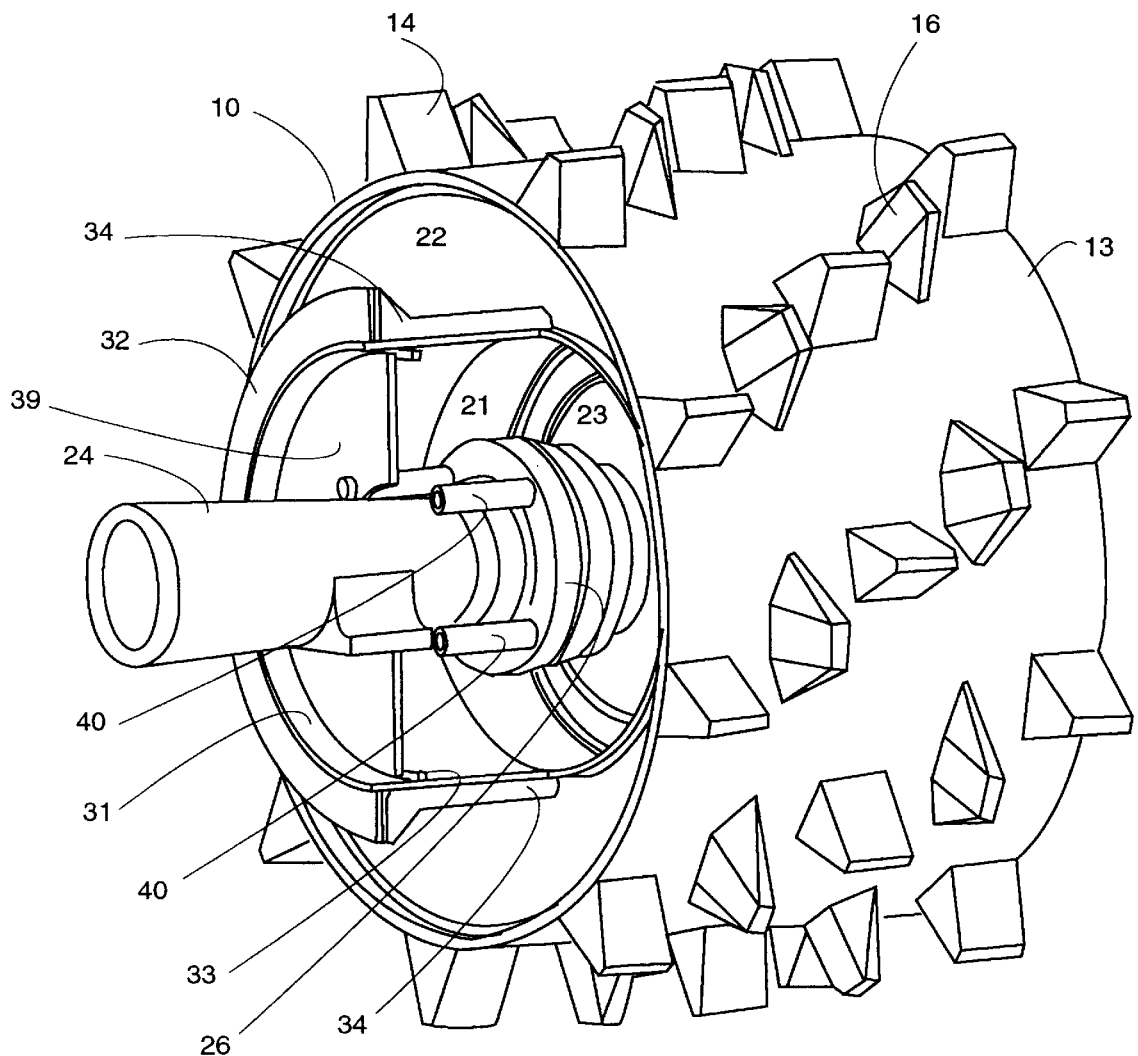
FIG. 4 is a perspective view, like FIG. 3, showing an alternate form of the present invention.
Figure 5:
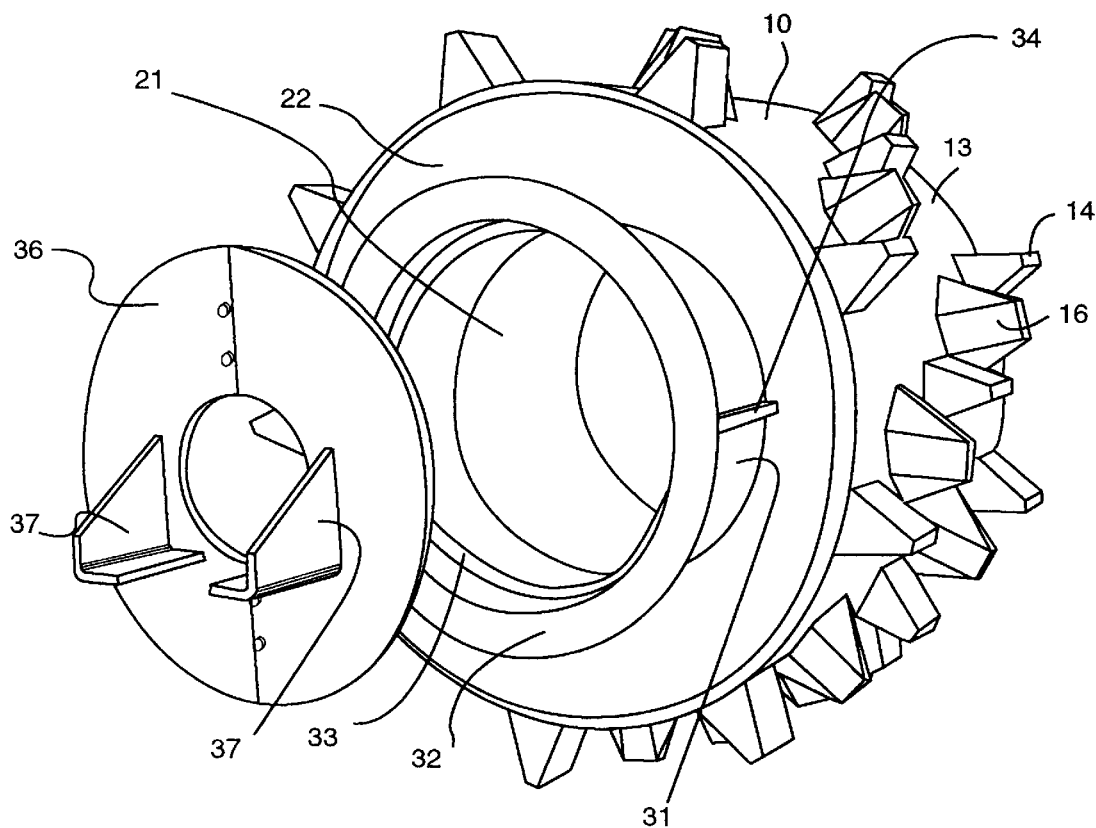
FIG. 5 is a perspective view showing the shroud member and closure plate members of the present invention.
Figure 7:
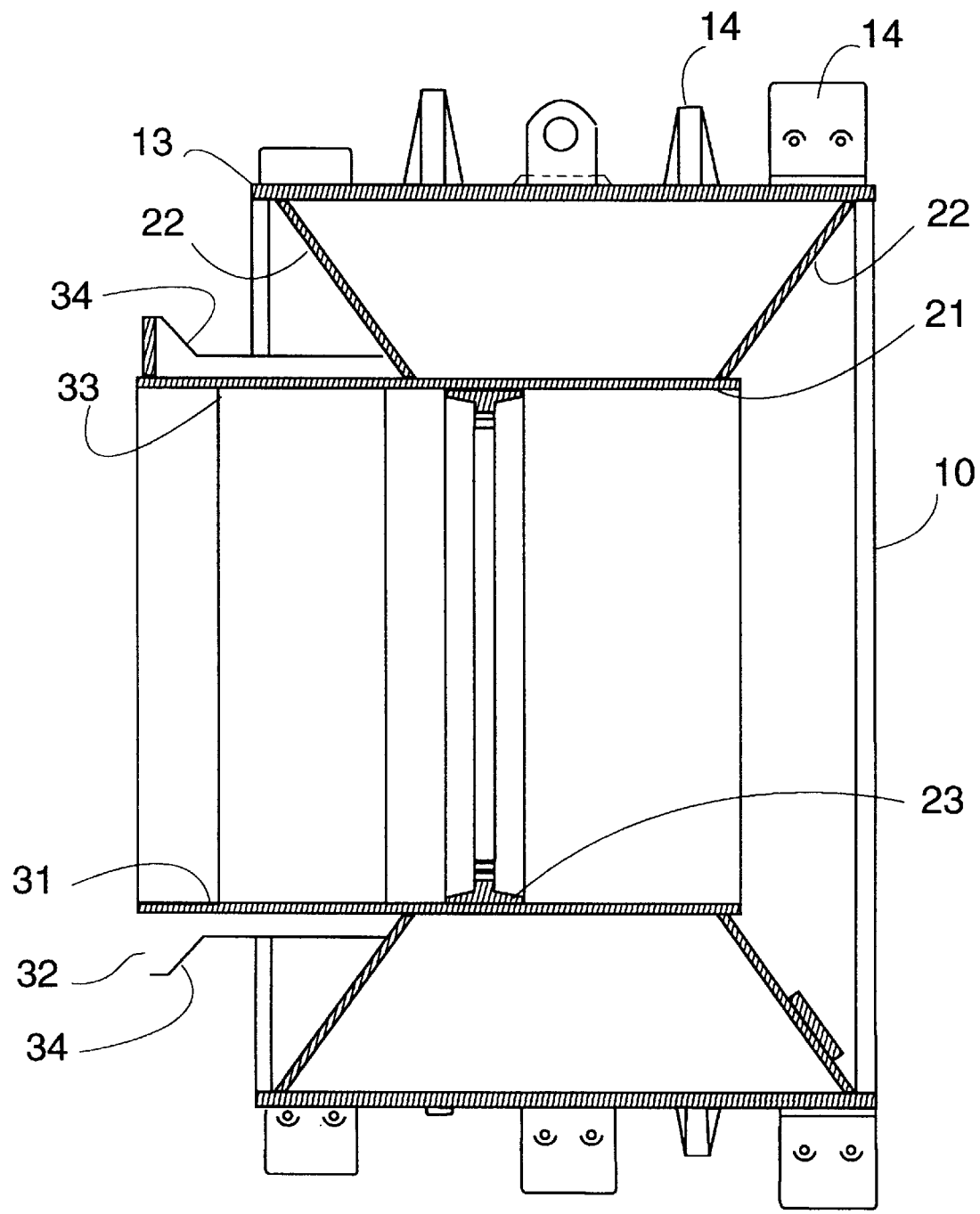
FIG. 7 is an axial sectional view of a compaction roller made according to the principles of the present invention.

The rigid mounting of the shroud 31 to the inner drum, is evident from FIGS. 3–5 and this arrangement provides a cavity into which the axle housing and its operative components are enclosed. A closure member or cover 36 is mounted from spaced brackets 37 secured to the axle housing 24. The closure 36 is generally cylindrical in form and is sized to be mounted in a close but non-interfering relationship with the shroud 31 which is rotatable with the roller 10. The cover 36 is mounted outwardly of the inner positioned ring 33 and spaced slightly apart therefrom so that there will be minimal frictional engagement between the cover 36 and the wire trap ring 33 under normal operating conditions as clearly shown in FIG. 4, the cover 36 is mounted by the fastening structures 40 to the assembly 26. The arrangement of the shroud 31, inner ring 33 and cover 36 is such that it presents a substantial obstacle for trash seeking to penetrate into the cavity 35 which protects the axle bearings and seals. The path from the exterior into the interior for trash to penetrate would be a serpentine path. It would be necessary to traverse along the short portion of the inner surface of the shroud to beneath the fixed cover plate 36 and then radially upwardly and inwardly over the inner wire trap ring 33. It has been found in field trials that there is little likelihood of trash finding its way through this serpentine path so as to engage the rotatable portions of the axle and its sub-assemblies.

Figure 6:
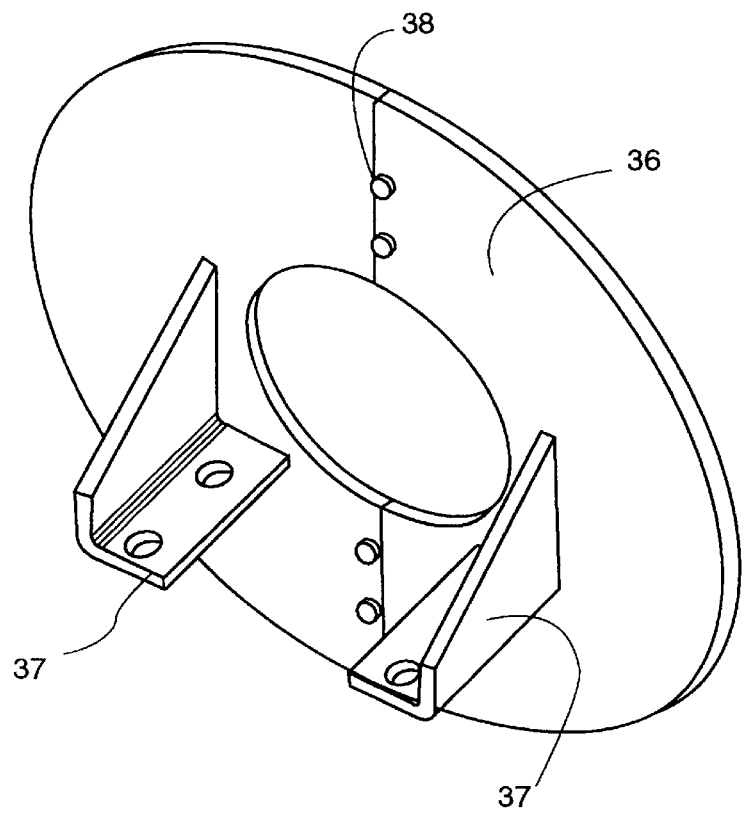
FIG. 6 is a perspective view showing the closure plate and mounting flange included in the present invention.

The cover 36 may be formed in two pieces mounted together as illustrated in FIG. 6. Tab like plates 37 (FIG. 3) are fixedly secured as by welding to one or the other of the cover halves facilitating field assembly and mounting of the cover plate and shroud assembly by bolts 38. The L-shaped brackets 37 may be either welded or bolted to the axle housing 24 as may be determined by the field conditions for mounting of the assembly.

From the foregoing, it will be readily evident that there has been provided an improved arrangement in compaction equipment operating on landfills for protecting axles, seals and wheel bearings from wire wrap intrusion so that the vehicle may operate over a long service life without attention to the removal of wire wrap. While there has been disclosed the preferred embodiment of the invention, various changes, modifications and additions will occur to those skilled in this field of endeavor but the invention shall not be limited except as expressed in the claims which follow.

What is claimed is:

1. In compaction equipment for a sanitary land fill wherein wire wrap materials are deployed and including a powered vehicle equipped with compaction rollers mounted upon axle drive shafts of the vehicle, such drive shafts being equipped with bearings and bearing seals, a combination wherein at least one of said rollers has a rigid cylindrical outer drum having an axial width sufficient to support a plurality of spaced apart circumferential rows of compaction cleats;

said roller having a rigid cylindrical inner drum co-axially disposed with respect to said outer drum;

frusto-conically shaped, generally radially extending web members fixedly secured to said inner and said outer drums such that the inner drum is positioned inwardly of the perimeter edges of said outer drum at least on a proximal side of said roller with respect to the vehicle;

flange means rigidly secured to said inner drum serving to mount said roller with respect to an axle shaft of the vehicle;

cylindrical shroud means fixedly secured to and rotatable with said roller and extending axially outwardly therefrom beyond the perimeter edges of said roller on a proximal side thereof, said shroud means surrounding the vehicle axle shaft, bearings and seals such that the shroud defines on said roller an axially extending interior cavity into which the axle shaft projects, the shroud means having a generally cylindrical, substantially unobstructed exterior surface presenting to the wire wrap materials a surface on to which the wire wrap materials do not adhere.

2. The combination of claim 1 further including a cover of annular configuration arranged within said shroud means serving to define a proximal end of said cavity and bracket means serving to mount said cover with respect to a chassis of the vehicle, the cover being sized to permit unobstructed rotation of said shroud while fitting sufficiently close to said shroud to preclude wire wrap materials from access to said cavity and such vehicle's axle shaft and bearing enclosed therein.

3. The combination of claim 2 wherein an annular wire trap flange member is fixedly mounted within said shroud means axially outwardly of said cover so as to define a serpentine path from the exterior into said cavity substantially precluding entry of trash materials into said cavity.

4. The combination of claim 1 wherein a plurality of axially extending, circumferentially spaced apart flange members are rigidly secured to the exterior surface of said shroud means serving to deflect trash therefrom and affording a work space for wire wrap removal should the same be entrained on the exterior of said shroud means.

5. In compaction equipment for a sanitary land fill wherein wire wrap materials are deployed and including a powered vehicle equipped with compaction rollers mounted upon axle drive shafts of the vehicle, such drive shafts being equipped with bearings and bearing seals, a combination wherein at least one of said rollers includes a rigid cylindrical outer drum having an axial width sufficient to support a plurality of spaced apart circumferential rows of compaction cleats;

said roller having a rigid cylindrical inner drum co-axially disposed with respect to said outer drum;

at least one frusto-conically shaped, generally radially extending web member fixedly secured to said inner and said outer drums such that the inner drum is positioned inwardly of the perimeter edges of said outer drum at least on a proximal side of said roller with respect to the vehicle;

flange means rigidly secured to said inner drum serving to mount said roller with respect to an axle shaft of the vehicle;

cylindrical shroud means fixedly secured to and rotatable with said roller and extending axially outwardly from said inner drum on said proximal side of said roller, said shroud means surrounding the vehicle axle shaft, bearings and seals such that the shroud defines on said roller an axially extending interior cavity into which the axle shaft projects, the shroud means having a generally cylindrical exterior surface presenting to the wire wrap materials a surface on to which the wire wrap materials do not fixedly adhere;

a ring member fixedly secured to an interior surface of said shroud means and spaced inwardly from an outer edge thereof; and a cylindrical cover member arranged within said shroud means inwardly from said outer edge and outwardly from said ring member, said cover member being mounted on an axle drive shaft housing in a position coaxial with said shroud means and axially closely spaced apart from said ring member permitting rotation of said shroud means around a circular perimeter of said cover member, the outer edge of said shroud means, said cover member perimeter and said ring member being arranged to define a serpentine barrier against wire wrap penetration into said interior cavity.

6. The combination of claim 5 and including a cylindrical outer flange mounted on said shroud means adjacent to said outer edge thereof and extending radially outwardly therefrom serving to inhibit wire wrap from engaging said cover member.

7. The combination of claim 5 wherein said cover member comprises two segments, and fastener means for securing said segments together and for mounting said cover member to said axle drive shaft housing.

8. The combination of claim 5 wherein a plurality of axially extending, circumferentially spaced apart flange members are rigidly secured to the exterior surface of said shroud means serving to deflect trash therefrom and affording a work space for wire wrap removal should the same be entrained on the exterior of said shroud means.

* * * * *

UNITED STATES PATENT AND TRADEMARK OFFICE
CERTIFICATE OF CORRECTION

PATENT NO. : 5,967,242
DATED : October 19, 1999
INVENTOR(S) : James O. Caron, Scott F.P. Caron and Donald Chris Bettencourt It is certified that error appears in the above-identified patent and that said Letters Patent is hereby corrected as shown below:

Column 3,
Line 43, after "and seal" and before "assembly (not shown)", delete -- to --.

Column 4,
Lines 15-16, before "conditions", at the beginning of the line, delete ", as" and insert -- . As --, so that it reads as a separate, complete sentence.

Signed and Sealed this

Twenty-first Day of May, 2002

Attest:

JAMES E. ROGAN
Attesting Officer
Director of the United States Patent and Trademark Office